US010619573B2

(12) United States Patent
Hield et al.

(10) Patent No.: US 10,619,573 B2
(45) Date of Patent: Apr. 14, 2020

(54) METHOD OF STARTING A GAS TURBINE ENGINE

(71) Applicant: ROLLS-ROYCE PLC, London (GB)

(72) Inventors: Paul Michael Hield, Bristol (GB); Richard John Tunstall, Bristol (GB); Caroline Louise Turner, Kingswood (GB); Alexander Edward Henry Fitzhugh, Bristol (GB)

(73) Assignee: ROLLS-ROYCE plc, London (GB)

( * ) Notice: Subject to any disclaimer, the term of this patent is extended or adjusted under 35 U.S.C. 154(b) by 622 days.

(21) Appl. No.: 14/887,918

(22) Filed: Oct. 20, 2015

(65) Prior Publication Data

US 2016/0138475 A1    May 19, 2016

(30) Foreign Application Priority Data

Nov. 18, 2014    (GB) .................................. 1420444.0

(51) Int. Cl.
*F02C 7/26* (2006.01)
*F02C 9/18* (2006.01)
(Continued)

(52) U.S. Cl.
CPC ................ *F02C 7/26* (2013.01); *F01D 17/00* (2013.01); *F01D 19/00* (2013.01); *F01D 25/10* (2013.01);
(Continued)

(58) Field of Classification Search
CPC ...... F02C 6/02; F02C 7/26; F02C 9/18; F02C 9/20; F02C 9/22; F02C 9/24; F02C 9/26;
(Continued)

(56) References Cited

U.S. PATENT DOCUMENTS 5,107,674 A * 4/1992 Wibbelsman ............. F02C 7/26
60/778
8,191,369 B2 * 6/2012 Geyer ..................... F02B 37/16
123/568.11
(Continued)

FOREIGN PATENT DOCUMENTS

EP        0401152 A2    12/1990

OTHER PUBLICATIONS

Walsh, Philip et al., Gas Turbine Performance [2004], Blackwell Science Ltd [Oxford UK], 2nd Edition, Chapters 8-9, pp. 444-500.*
(Continued)

*Primary Examiner* — Jason H Duger
(74) *Attorney, Agent, or Firm* — Oliff PLC

(57) ABSTRACT

A gas turbine engine comprises a compressor driven by a shaft, and a reference starting schedule, the compressor having a reference stability boundary, with the reference starting schedule defining a reference working line. A method of starting the gas turbine engine is described in which the method comprises the steps of:
(i) accelerating the rotational speed of the shaft towards an engine idle speed;
(ii) defining for the compressor, as the rotational speed increases, an operational working line; and
(iii) modifying at least one operating parameter of the gas turbine engine as the rotational speed increases such that for a rotational speed, an operational working line is closer to the reference stability boundary than the reference working line is to the reference stability boundary.

7 Claims, 1 Drawing Sheet

(51) Int. Cl.
  *F02C 9/22* (2006.01)
  *F01D 17/00* (2006.01)
  *F01D 19/00* (2006.01)
  *F01D 25/10* (2006.01)
  *F02C 9/20* (2006.01)

(52) U.S. Cl.
  CPC .......... *F02C 9/18* (2013.01); *F02C 9/20* (2013.01); *F02C 9/22* (2013.01); *F05D 2220/32* (2013.01); *F05D 2260/85* (2013.01); *F05D 2270/101* (2013.01); *Y02T 50/675* (2013.01)

(58) Field of Classification Search
  CPC ...... F02C 9/28; F02C 9/48; F02C 9/50; F02C 9/52; F02C 9/54; F05D 2270/101; F05D 2270/102; F05D 2270/1024; F04D 27/02; F04D 27/0207; F04D 27/0215; F04D 27/0223; F01D 17/00; F01D 19/00; F01D 25/10
  See application file for complete search history.

(56) References Cited

U.S. PATENT DOCUMENTS

| 9,605,595 B2* | 3/2017 | Djelassi | F02C 9/28 |
| 2009/0271086 A1* | 10/2009 | Morris | F02C 6/08 |
|  |  |  | 701/100 |
| 2010/0011740 A1 | 1/2010 | McVey |  |

OTHER PUBLICATIONS

May 15, 2015 Search Report issued in British Patent Application No. 1420444.0.

* cited by examiner

METHOD OF STARTING A GAS TURBINE ENGINE

This invention claims the benefit of UK Patent Application No. 1420444.0, filed on 18 Nov. 2014, which is hereby incorporated herein in its entirety.

FIELD OF THE INVENTION

The present invention relates to a method of starting a gas turbine engine and particularly, but not exclusively, to a method of starting an aircraft gas turbine engine.

BACKGROUND TO THE INVENTION

The compressor in a gas turbine engine is designed to operate over a wide range of gas flow and rotational speed while delivering a stable pressure ratio. During the engine start phase, the compressor must be capable of such stable operation at low rotational speeds.

Compressor surge is an undesirable phenomenon in which the compressor operates in an unstable manner. Surge is manifested as an operating condition having a compressor back pressure that is higher than the pressure capability of the compressor, which in turn causes the previously steady compressor flow to break down and reverse direction.

This flow breakdown changes the forces applied to the compressor rotor and in so doing causes large flow fluctuations through the compressor. This can result in high levels of vibration and may cause significant mechanical damage to the engine.

Rotating stall and stall flutter are other compressor instabilities which are undesirable and have the potential to cause engine damage. In general, rotating stall is more likely to occur at low engine speeds, whereas surge is more likely to occur at high engine speeds. Collectively, these are types of compressor instability. (Note that in the USA, compressor surge is known as compressor stall).

These compressor instabilities are fundamentally caused by flow separation in a compressor blade row. The extent and severity of the flow separation (radially and axially) and the blade's response dictate the engine's response and hence the name given to the event.

The compressor operating conditions associated with instability are represented on a compressor performance map as a stability boundary commonly known as a surge, or stall, line, i.e. a boundary between stable compressor operation and unstable (surge/stall) operation. The margin between this line and the compressor operating point is commonly referred to as a surge margin and may be defined as:

$$SM = \frac{(PR_{surge} - PR_{working})}{PR_{working}}$$

where: $PR_{surge}$=pressure ratio on the surge line at a corrected mass flow rate, $\omega_c$;

$PR_{working}$=pressure ratio on the working line at mass flow rate, $\dot{m}$.

Consequently, conventional ground starting schedules for aircraft gas turbine engines are arranged to provide the engine with optimum conditions for the 'light up' phase whilst avoiding compressor instability by keeping the operating point well away from the surge line.

Normally a ground start fuel control schedule is arranged to give the best chance of light up while remaining clear of compressor stability boundaries, with margin to allow for the worst case stability margin in the life of the engine.

Once the engine is operating above the idle speed, the engine operating control strategy maintains stable compressor operation by ensuring that the compressor working line is sufficiently separated from the surge line to accommodate degradation of the surge margin over the life of the engine. Surge margin "aids" such as handling bleeds and variable stator vanes in the engine are controlled by the engine's control system to allow surge free operation through life.

The provision of high levels of surge margin is often required in order to ensure that stable operation of the compressor is possible over its full expected operating range.

Increasing the surge margin provides certainty that the compressor operating point remains away from the surge line but tends to compromise other attributes such as compressor cost, weight and efficiency.

STATEMENTS OF INVENTION

According to a first aspect of the present invention there is provided a method of starting a gas turbine engine, the gas turbine engine comprising a compressor driven by a shaft, and a reference starting schedule, the compressor having a reference stability boundary, with the reference starting schedule defining a reference working line, the method comprising the steps of:

(i) accelerating the rotational speed of the shaft towards an engine idle speed;

(ii) defining for the compressor, as the rotational speed increases, an operational working line; and (iii) modifying at least one operating parameter of the gas turbine engine as the rotational speed increases such that for a rotational speed, an operational working line is closer to the reference stability boundary than the reference working line is to the reference stability boundary.

The proximity of the reference working line to the reference stability boundary is defined as the reference surge margin. Similarly, the proximity of the operational working line to the reference stability boundary is defined as the operational surge margin. These definitions follow accepted gas turbine engine terminology and would be understood by a skilled person.

The operational surge margin will vary across the engine's operating envelope. The engine operating point at which the operational surge margin is a minimum is defined as the operational pinch point.

A corresponding definition can be applied to the engine operating point at which the reference surge margin is a minimum; this being defined as the reference pinch point.

The method of the invention involves modifying the normal ground engine start schedule for the gas turbine engine such that the operational surge margin is smaller than the reference surge margin at any other point in anticipated operation, throughout the flight envelope.

An engine which has run out of surge margin will then encounter an instability, such as rotating stall or surge, during start. This instability event may be indicated to the pilot or may be recorded for maintenance. The instability event may be annunciated in the cockpit and may be logged to allow subsequent maintenance actions to investigate reasons for the lowered surge margin.

The method of the invention therefore provides a robust means of identifying engines that have insufficient surge margin through their flight envelope without the engine having to experience a surge event during above-idle operation. This significantly reduces both the risk of damage to the engine, and the flight safety risk posed by an engine experiencing an instability event, for example, during take-off.

In cases where the method of the invention identifies an engine as having insufficient surge margin across its flight envelope, the engine's operator can take additional precautions when operating the engine so as to minimise the risk of a surge event occurring during the flight envelope. This will also reduce the risk of engine damage which can result from a surge event.

The engine control system can be set to perform a recovery action automatically (for example, fuel dip as part of stall detection and recovery logic is typically already included in modern engine control systems). This stall recovery action ensures that the engine can still be started and aircraft departure is not compromised.

It is likely to be important that inflight relighting is not affected by any engine starting schedule, so the starting schedule of the invention may be restricted to normal ground starts only. The control logic may be designed so that the 'uprated' test start schedule is only used on a periodic basis (for example on every $10^{th}$ start) or is only activated when requested in some manner.

Optionally, the at least one operating parameter is one of the group comprising fuel flow rate, compressor bleed flow rate, compressor variable vane angle, compressor blade tip clearance, turbine nozzle guide vane angle, variable flow areas within the engine, and power offtake.

Increasing the fuel flow rate increases the combustor exit temperature and, for a fixed downstream area (such as a fixed turbine Nozzle Guide Vane capacity), causes a rise in upstream pressure and a decrease in air flow. This has the effect of reducing the surge margin of an upstream compressor.

Compressor bleed flow valves are usually open during engine start to allow a larger compressor exit area and hence a lower compressor working line. Closing the compressor bleed valves has the effect of reducing the compressor exit area and so raising the compressor working line.

Compressor inlet guide vane and stator vane angles are sometimes varied to change the angle of incidence of airflow onto the compressor rotor blades at off-design conditions and so to prevent compressor instability due to flow separation. Deliberately 'malscheduling' these vanes, for example, by opening them further than the nominal schedule during start, could be used to provoke an instability.

A large compressor tip clearance increases tip losses which reduces engine efficiency and both raises the compressor's working line, and lowers the surge line (stability boundary) since flow can reverse more easily.

There are a number of points within a gas turbine engine at which the flow area may be varied. Such variation in flow area can shift the working line of the compressor. For example, reducing the flow area downstream of a compressor forces it to operate on a higher working line, closer to the stability boundary.

In alternative arrangements, the at least one operating parameter may include other engine operation control variables.

Optionally, step (iii) comprises the step of:
(iii)' applying a power offtake to the shaft as the rotational speed increases such that for a rotational speed an operational working line is closer to the reference stability boundary than the reference working line is to the reference stability boundary.

Increasing the power offtake from the engine may be achieved by, for example, engaging one or more auxiliary drives to fluid pumps, electrical generators or similar.

One consequence of increasing the power offtake from the engine is that the quantity of fuel supplied to the engine will increase, which in turn will cause the operational working line to move closer to the reference stability boundary than the reference working line is to the reference stability boundary. In other words, as the power offtake is increased the operational surge margin becomes smaller than the reference surge margin.

Optionally, step (iii) comprises the step of:
(iii)" actuating a variable geometry engine feature as the rotational speed increases such that for a rotational speed an operational working line is closer to the reference stability boundary than the reference working line is to the reference stability boundary.

It is well known for gas turbine engines to incorporate variable geometry features within the air flow path through the engine. These variable geometry features are conventionally configured so as to lower the compressor's working line and thus to increase the surge margin, particularly during engine conditions that are known to be vulnerable to instabilities such as stall or surge.

In the method of the present invention, such variable geometry features could be configured to operate in the opposite sense to that in which they would conventionally be employed. In other words they could be configured so as to raise the compressor's working line.

By raising the compressor's working line during the engine start schedule, the method of the invention creates an operational pinch point during the start sequence, which will provide an indicator of whether the engine has insufficient surge margin through its flight envelope.

Optionally, the variable geometry feature is one of the group comprising handling bleed valves, variable inlet guide vanes, variable turbine nozzle guide vanes, other variable flow areas within the engine, and compressor blade tip clearance.

Optionally, step (iii) comprises the step of:
(iii)''' increasing the demanded rate of change of engine speed as the rotational speed increases such that for a rotational speed an operational working line is closer to the reference stability boundary than the reference working line is to the reference stability boundary.

During a conventional gas turbine engine start schedule, the rotational speed of the engine is generally controlled to a rate of change of shaft speed.

In the method of the present invention, this rate of change of shaft speed is increased, leading to a faster fuel flow rate increase, which will result in the engine's working line being raised. This in turn will create an operational pinch point during the start schedule, which will provide an indicator of whether the engine has insufficient surge margin through its flight envelope.

Optionally, step (iii) comprises the step of:
(iii)'''' increasing the quantity of fuel supplied to the combustor as the rotational speed increases such that for a rotational speed an operational working line is closer to the reference stability boundary than the reference working line is to the reference stability boundary.

A conventional gas turbine engine start schedule is often controlled by varying the fuel flow rate to the engine with the rotational speed of the compressor.

Such a conventional start schedule is generally defined so as to avoid compressor stall. This is achieved by providing a large surge margin during the entire starting envelope.

In the method of the present invention, the fuel flow rate is increased above the rate that would be used during a conventional starting schedule, which in turn results in the the engine's working line being raised. This in turn will create an operational pinch point during the start schedule, which will provide an indicator of whether the engine has insufficient surge margin through its flight envelope.

The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention.

DETAILED DESCRIPTION

Figure 1:
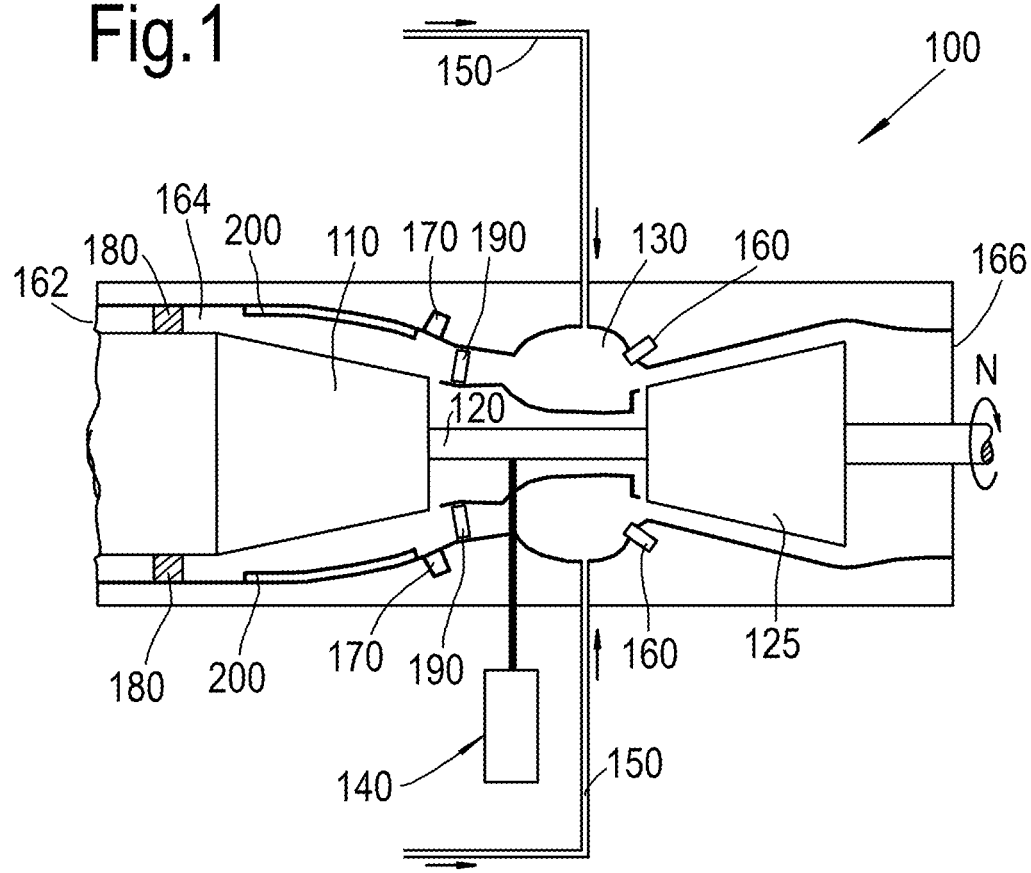
FIG. 1 shows; a schematic arrangement of a gas turbine engine.

FIG. 1 shows a conventional gas turbine engine 100 comprising a compressor 110 connected to a turbine 125 by a shaft 120. The engine 100 further comprises one or more combustors 130 to which fuel is supplied via fuel lines 150 and ignited by igniters 160. The engine 100 has an intake 162 that is in fluid communication with a duct 164 within which is positioned in series the compressor 110, combustors 130 and turbine 125, and an outlet 166.

The air path through the compression system of the engine 100 comprises handling bleed valves 170 and variable inlet guide vanes 180. The variable inlet guide vanes 180 can be mechanically repositioned to alter the characteristics of the air flow through the air duct 164. Similarly, the handling bleed valves 170 can be actuated to alter the pressure of the air flow within the compression system.

The air duct 64 through the engine 100 further comprises variable turbine nozzle guide vanes 190 and active compressor blade tip clearance control 200.

The structure, function and operation of the handling bleed valves 170, the variable inlet guide vanes 180, the variable turbine nozzle guide vanes 190, and the active compressor blade tip clearance control 200 are well known in the field of gas turbine engine design and so are not discussed further here.

When starting the engine 100, the shaft 120 is initially rotated by a starter motor 140 thereby causing the compressor 110 to draw air into the intake 162. This air is compressed by the compressor 110 and passes via the duct 164 into the combustors 130 where fuel is injected and ignited. The resulting combustion products expand through the turbine 125 thereby driving the shaft 120, and exhaust from the engine outlet 166.

As the rotational speed N of the shaft 120 increases due to the power produced by the turbine 125, the assistance provided by the starter motor 140 is reduced. Once the rotational speed N of the shaft 120 reaches the engine idle speed, the starter motor 140 provides no further assistance.

Figure 2:
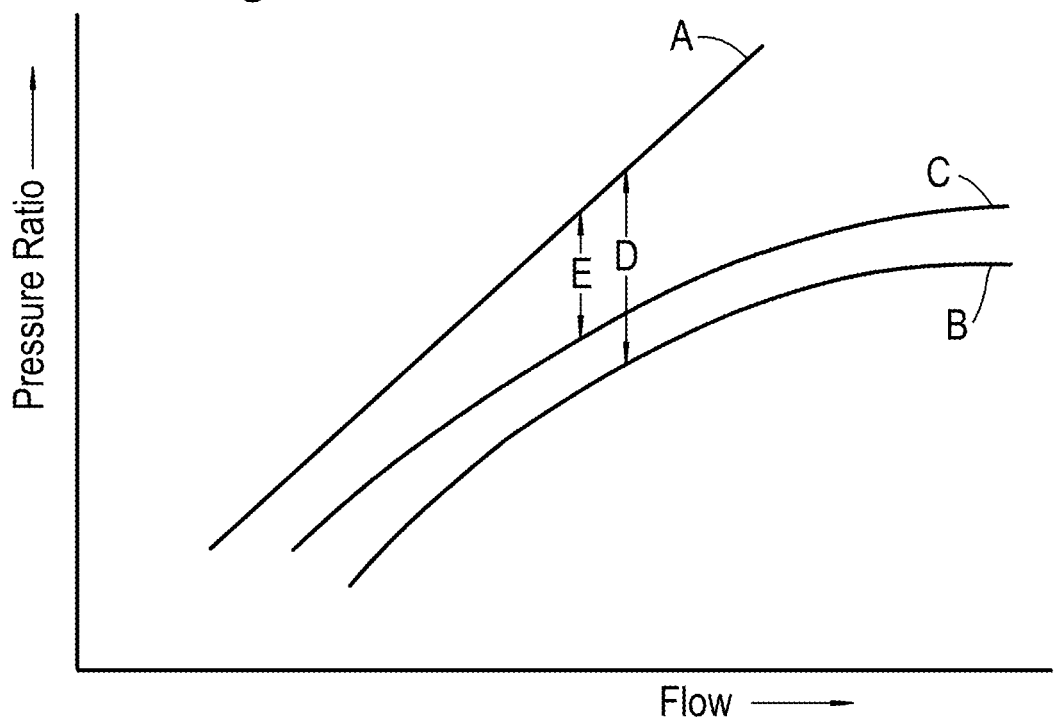
FIG. 2 shows a schematic compressor map for a gas turbine engine operating in accordance with the method of the present invention.

FIG. 2 shows a schematic representation of a compressor map for a typical gas turbine engine compressor 110.

A fundamental characteristic of the compressor 110 is the reference stability boundary (indicated as A in FIG. 2). The reference stability boundary A delimits a region (above the line A) in which the compressor 110 will exhibit surge.

When following a conventional engine start schedule, the compressor 110 will be controlled to follow a reference working line B. For any engine operating condition, the reference working line B is separated from the reference stability boundary A by a reference surge margin D.

When following the method of the present invention to start the engine 100, one or more of the operating parameters of the engine 100 are further modified so as to control the compressor 110 to follow an operational working line C. The operational working line C is closer to the reference stability boundary A than the reference working line B is to the reference stability boundary A.

Similarly, for any engine operating condition the separation between the operational working line C and the reference stability boundary A is termed the operational surge margin E. As indicated in FIG. 2, for any engine operating condition the operational surge margin E is less than the reference surge margin D.

In the method of the present invention, the operational starting schedule is modified such that for a rotational speed N of the shaft 120, the operational working line C is closer to the reference stability boundary A than the reference working line B is to the reference stability boundary A. In other words, the operational starting schedule results in the operational surge margin E being smaller than the reference surge margin D over the operating envelope of the engine 100.

In a first embodiment of the invention the shift in the operational working line C is achieved by applying a power offtake to the engine 100. This approach involves, for example, engaging an auxiliary drive to an engine ancillary such as a hydraulic pump, an alternator or similar.

This will require an increased quantity of fuel to be supplied to the engine 100 during the operational starting schedule in order to accelerate the engine 100 up to the engine idle speed. The increased quantity of fuel supplied to the engine 100 results in the operational working line C being raised towards the reference stability boundary A.

In a second embodiment of the invention the shift in the operational working line C is achieved by actuating a variable geometry feature within the engine 100. One example of a variable geometry feature is the variable inlet guide vanes 180 positioned within the air duct. Opening of the variable inlet guide vanes 180 at low speeds results in the compressor map changing such that the low speed surge margin is significantly reduced.

Another example of a variable geometry feature is handling bleed valves 170. The handling bleed valves 170 at the rear of a compressor can be closed during engine start to reduce the effective area of the compressor and raise the working line. Interstage handling bleeds can do the same for upstream stages of the compressor.

A further example of a variable geometry feature is variable turbine nozzle guide vanes, which can reduce the compressor exit area. Reducing the compressor exit area will raise the operational working line C. A still further example of a variable geometry feature is active compressor blade tip clearance control. Increasing the compressor blade tip clearance will raise the operational working line C. However, it will also lower the reference stability boundary.

In a third embodiment of the invention the shift in the operational working line C is achieved by increasing the demanded rate of change of engine speed. The increase in demanded rate of change of engine speed results in an increase in the quantity of fuel supplied to the engine 100.

As outlined above with respect to the first embodiment of the invention, this raises the operational working line C of the engine 100 towards the reference stability boundary A.

In a fourth embodiment of the invention the shift in the operational working line C is achieved by increasing the quantity of fuel supplied to the engine 100. As mentioned above, this raises the operational working line C of the engine 100 towards the reference stability boundary A.

In each of the embodiments of the invention described above, the method of the invention results in the operational working line C of the engine B being raised closer to the reference stability boundary A than the reference working line B is to the reference stability boundary A.

If the engine 100 does not have sufficient surge margin across its entire flight envelope then a consequence of starting the engine with a deliberately reduced operational surge margin D is that the engine will stall before it reaches an engine idle speed.

This stall event may be logged to aid in predicting required maintenance activities for the engine 100.

The engine arrangement shown in FIG. 1 and described above in relation to the method of the invention is known as a 'single shaft' gas turbine engine 100. The method of the invention is equally applicable to alternative gas turbine engine arrangements having multiple compressor/turbine pairs and multiple shafts (for example, 'two shaft' or 'three shaft' engines).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

The invention claimed is:

1. A method of identifying a surge margin of a compressor of a gas turbine engine during a start-up phase of the gas turbine engine, the compressor driven by a shaft and having a reference stability boundary above which the compressor will exhibit instability, the gas turbine engine having a reference starting schedule defining a reference working line of the compressor arranged to avoid exceeding the reference stability boundary during starts, the method modifying operation of the gas turbine engine to differ from the reference starting schedule and comprising the steps of:
   (i) accelerating a rotational speed of the shaft towards an engine idle speed during the start-up phase of the gas turbine engine, the start-up phase being defined as a period from ignition of the gas turbine engine to the gas turbine engine reaching the engine idle speed;
   (ii) defining an operational working line followed by the compressor as the rotational speed of the shaft accelerates towards the engine idle speed during the start-up phase;
   (iii) modifying at least one operating parameter of the gas turbine engine as the rotational speed of the shaft accelerates towards the engine idle speed thereby defining an operational pinch point and such that the operational working line followed by the compressor is closer to the reference stability boundary than the reference working line is to reference stability boundary during every operating point of the start-up phase;
   (iv) monitoring to determine whether the operational working line followed by the compressor exceeds the reference stability boundary during the start-up phase;
   (v) detecting a stall event in which the operational working line followed by the compressor exceeds the reference stability boundary during the start-up phase; and
   (vi) in response to detecting the stall event during the start-up phase, determining and notifying a user that the surge margin of the compressor is not sufficient across an entire flight envelope of the gas turbine engine.

2. The method as claimed in claim 1, wherein the at least one operating parameter is one of: fuel flow rate, compressor bleed flow rate, compressor variable vane angle, compressor blade tip clearance, turbine nozzle guide vane angle, variable flow area within the gas turbine engine, and power offtake.

3. The method as claimed in claim 1, wherein the modifying of at least one operating parameter of the gas turbine engine in step (iii) includes applying a power offtake to the shaft.

4. The method as claimed in claim 1, wherein the modifying of at least one operating parameter of the gas turbine engine in step (iii) includes actuating a variable geometry engine feature.

5. The method as claimed in claim 4, wherein the variable geometry engine feature is one of: at least one handling bleed valve, variable inlet guide vane, at least one variable turbine nozzle guide vane, and at least one compressor blade tip clearance.

6. The method as claimed in claim 1, wherein the modifying of at least one operating parameter of the gas turbine engine in step (iii) includes increasing a demanded rate of change of engine speed.

7. The method as claimed in claim 1, wherein the modifying of at least one operating parameter of the gas turbine engine in step (iii) includes increasing a quantity of fuel supplied to the gas turbine engine.

* * * * *